(12) United States Patent  
Bouhabila et al.

(10) Patent No.: US 9,248,396 B2  
(45) Date of Patent: Feb. 2, 2016

(54) PROCESS AND DEVICE FOR IMPROVING THE CAPTURE OF SO2 IN ELECTROLYTIC CELL GASES

(71) Applicant: SOLIOS ENVIRONNEMENT, Saint Germain en Laye (FR)

(72) Inventors: El-Hani Bouhabila, Saint Germain en Laye (FR); Thierry Malard, Saint Germain en Laye (FR)

(73) Assignee: FIVES SOLIOS, Saint Germain en Laye (FR)

( * ) Notice: Subject to any disclaimer, the term of this patent is extended or adjusted under 35 U.S.C. 154(b) by 0 days.

(21) Appl. No.: 14/355,696

(22) PCT Filed: Nov. 22, 2012

(86) PCT No.: PCT/FR2012/052704
§ 371 (c)(1),
(2) Date: May 1, 2014

(87) PCT Pub. No.: WO2013/093268
PCT Pub. Date: Jun. 27, 2013

(65) Prior Publication Data
US 2014/0283687 A1 Sep. 25, 2014

(30) Foreign Application Priority Data
Dec. 19, 2011 (FR) .................................. 11 61928

(51) Int. Cl.
*B01D 53/02* (2006.01)
*B01D 53/12* (2006.01)
*B01D 53/50* (2006.01)
*B01D 53/68* (2006.01)
(Continued)

(52) U.S. Cl.
CPC .............. *B01D 53/12* (2013.01); *B01D 53/508* (2013.01); *B01D 53/685* (2013.01); *C25C 3/22* (2013.01);
(Continued)

(58) Field of Classification Search
CPC ................. B01D 2253/104; B01D 2257/2047; B01D 2257/302; B01D 2258/025; B01D 53/12; B01D 53/508; B01D 53/685; B01D 53/83; B01J 2219/00038; B01J 2219/0004; C25C 3/22

See application file for complete search history.

(56) References Cited

U.S. PATENT DOCUMENTS 5,885,539 A 3/1999 Bjarno et al.
7,731,924 B2 6/2010 Cloutier et al.
(Continued)

FOREIGN PATENT DOCUMENTS

| EP | 2360296 A1 | 8/2011 |
| WO | 9615846 A1 | 5/1996 |
| WO | 2007096492 A1 | 8/2007 |
| WO | 2010142892 A1 | 12/2010 |

OTHER PUBLICATIONS

International Search Report and Written Opinion, dated Jun. 24, 2013, from corresponding PCT application.

*Primary Examiner* — Christopher P Jones
(74) *Attorney, Agent, or Firm* — Young & Thompson

(57) ABSTRACT

A method and device for capturing SO2 present in gases originating from cells for the industrial production of aluminum by igneous electrolysis, implemented over a group of at least two reactors passed through in parallel by a gas stream and supplied with a powdered sorption agent capable of adsorbing effluents present in the gas stream by placing the sorption agent in contact with the gas stream, each reactor having collection elements for collecting the sorption agent after contact with the gas stream, at least one of the reactors having discharge elements for discharging the sorption agent after contact with the gas stream to injection elements for injecting into at least another one of the reactors; and desorbing elements located between the discharge elements and the injection elements, for desorbing the SO2 adsorbed by the sorption agent before it reaches the discharge elements.

14 Claims, 3 Drawing Sheets

Figure 1:
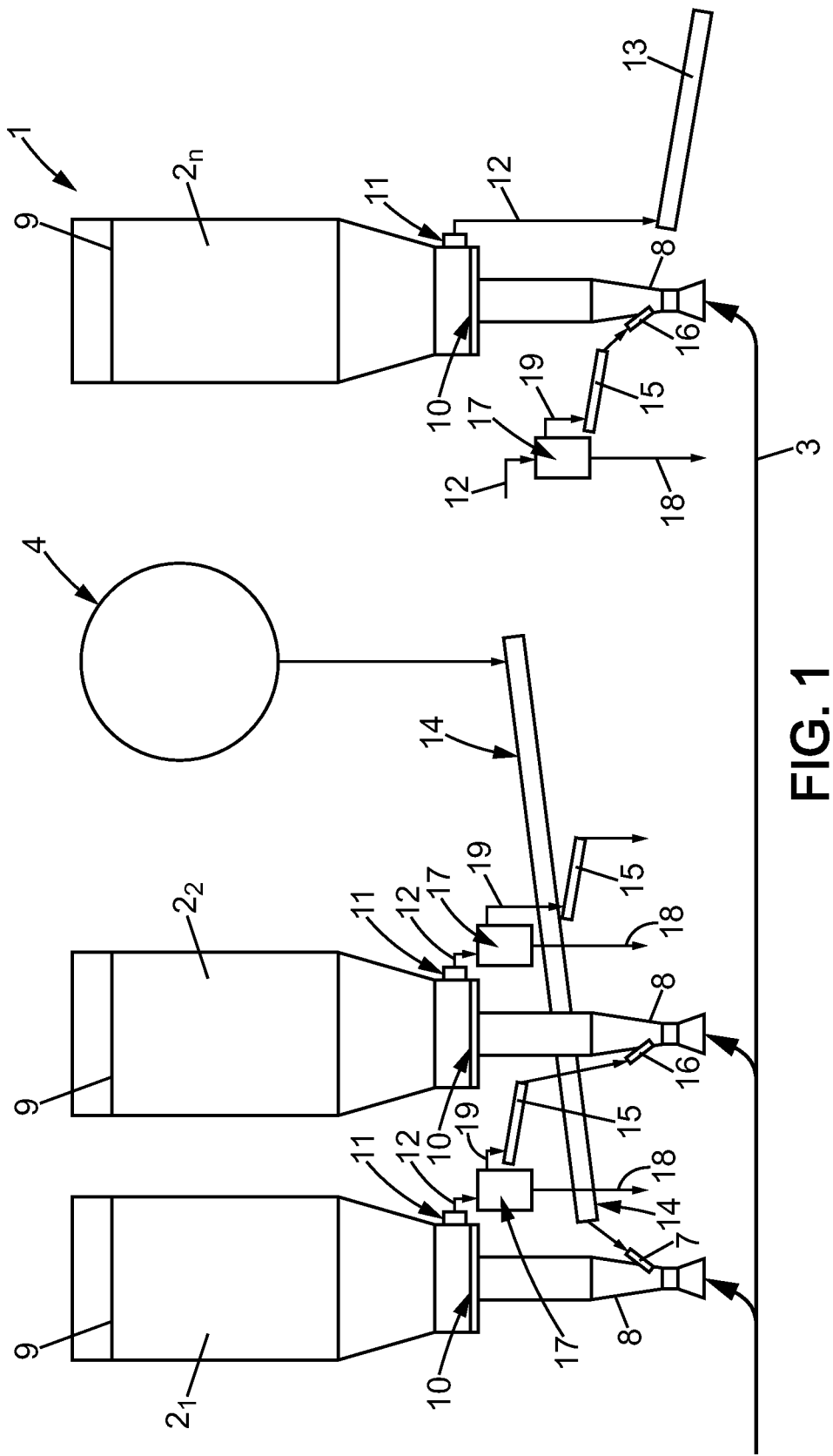

(51) Int. Cl.
*C25C 3/22* (2006.01)
*B01D 53/83* (2006.01)

(52) U.S. Cl.
CPC ........... *B01D 53/83* (2013.01); *B01D 2253/104* (2013.01); *B01D 2257/2047* (2013.01); *B01D 2257/302* (2013.01); *B01D 2258/025* (2013.01); *B01J 2219/0004* (2013.01); *B01J 2219/00038* (2013.01)

(56) References Cited

U.S. PATENT DOCUMENTS

| | | | |
|---|---|---|---|
| 2008/0250715 A1* | 10/2008 | Cooper | B01D 47/06 48/197 FM |
| 2009/0068077 A1 | 3/2009 | Cloutier et al. | |
| 2010/0254874 A1* | 10/2010 | Mahieu | B01D 53/10 423/247 |

* cited by examiner

PROCESS AND DEVICE FOR IMPROVING THE CAPTURE OF SO2 IN ELECTROLYTIC CELL GASES

BACKGROUND OF THE INVENTION

The present invention relates to a method and a device for capturing the SO2 present in the gases originating from cells for the industrial production of aluminium by igneous electrolysis. The method is implemented over a group of at least two reactors passed through in parallel by a gas stream and supplied at least partly in series with a sorption agent of the powder material type, in particular alumina particles, capable of adsorbing effluents present in the gas stream by placing the sorption agent in contact with the gas stream.

DESCRIPTION OF THE RELATED ART

The use of alumina particles in gas treatment reactors for adsorbing the hydrofluoric acid (HF) present in the gases given off by the cells for the industrial production of aluminium by igneous electrolysis is a well-known and effective technology. It is also known that the alumina, with its large adsorption surface area (up to 82 $m^2/g$), can also under certain conditions adsorb the sulphur dioxide (SO2) that is also present in the cell gases.

Although alumina adsorbs SO2 very easily, capturing the SO2 present in the gases originating from the electrolytic cells is not easy, as the alumina adsorbs the HF preferentially with respect to the SO2. When HF and SO2 are present in the gases to be treated, in order to be able to capture the SO2 it is necessary to use a sufficient quantity of alumina so that the latter is not saturated after having adsorbed the HF. In the event of the alumina being saturated with SO2 following treatment of a gas that does not contain HF, the SO2 would be desorbed if the alumina were placed in contact with a gas containing HF, with the HF replacing the SO2 on the alumina particles.

Moreover, it is known that the desorption of the SO2 from the alumina takes place from a temperature of approximately 200° C., whereas HF only desorbs from approximately 400° C.

In practice, the quantity of alumina injected into the gas treatment reactors is generally 10% greater than the quantity required to adsorb the HF. The quantity of alumina originating from the gas treatment is also that required for the electrolytic cells, so it is consumed therein and it is unnecessary to supply the cells with fresh alumina. For the alumina to also adsorb the SO2 after capturing the HF, it would be necessary to inject a much larger quantity of alumina into the reactors, approximately twice that necessary to adsorb the HF. This would result in an additional quantity of alumina at the output of the reactors that could not be consumed in the electrolytic cells.

Patent EP0793527 proposes the use of two treatment stages in a single reactor-filter unit so as to successively capture the HF then the SO2. The gases to be treated, laden with HF and SO2, pass through a first stage composed of the reactor, where they encounter regenerated alumina. On leaving the reactor, the HF is completely adsorbed on the alumina. The gases are then sent to a mechanical device for the separation of the fluorinated alumina from the gases. On leaving the first stage, the gases are thus scrubbed of the HF. They are then sent to the second stage, the filter, where fresh alumina is injected in order to capture the SO2. The SO2-laden alumina is finally sent to a desorbing unit where the SO2 is extracted from the alumina. The alumina regenerated in this way is returned to the first stage of treatment and the concentrated SO2 is sent to an upcycling system. This solution is not fully satisfactory, as it requires a bulky and expensive device for separating the fluorinated alumina in the first stage of the treatment.

SUMMARY OF THE INVENTION

In order to overcome these drawbacks, the invention consists of a method of capturing the SO2 present in the gases originating from cells for the industrial production of aluminium by igneous electrolysis, implemented over a group of at least two reactors passed through in parallel by a gas stream and supplied with a sorption agent of the powder material type capable of adsorbing effluents present in the gas stream by placing the sorption agent in contact with the gas stream, said at least two reactors each having means of collecting said sorption agent after it has been placed in contact with said gas stream, at least one of said reactors having means of discharging said sorption agent after it has been placed in contact with said gas stream to means of injection into at least another one of said reactors, characterized in that between the discharge means and the injection means, the SO2 adsorbed by said sorption agent by being placed in contact at least once with said gas stream is desorbed before the sorption agent reaches said discharge means.

In order to desorb the SO2, said sorption agent is, for example, brought to a temperature close to 200° C., and in any case remaining significantly below 400° C. in order not to desorb the HF. With the same aim, the sorption agent can also be placed in contact with a carrier gas. The carrier gas also makes it possible to facilitate the discharge of the SO2 from the system. Heating the sorption agent and flushing the latter with a carrier gas are two means of desorbing the sorption agent that are advantageously combined for increased efficiency.

According to a preferred and advantageous embodiment of the invention, the sorption agent is alumina $Al_2O_3$.

The carrier gas is for example nitrogen.

According to an embodiment of the invention, the carrier gas is heated to a temperature of at least up to 200° C., but remaining close to 200° C., before being placed in contact with the sorption agent.

According to an advantageous embodiment of the invention, the reactors are arranged in at least one sequence of at least two reactors supplied at least partly in series with sorption agent, and the sorption agent is desorbed after each reactor, optionally with the exception of the last in said sequence, or every two reactors, or after a variable number of reactors of said sequence, or starting from the reactor of said sequence in which the sorption agent has reached an overall saturation level close to 100%.

The invention also consists of a device for capturing the SO2 present in gases originating from cells for the industrial production of aluminium by igneous electrolysis, implemented over a group of at least two reactors passed through in parallel by a gas stream and supplied with a sorption agent of the powder material type capable of adsorbing effluents present in the gas stream by placing the sorption agent in contact with the gas stream, said at least two reactors each having means of collecting said sorption agent after it has been placed in contact with said gas stream, at least one of said reactors having means of discharging said sorption agent after it has been placed in contact with said gas stream to means of injection into at least another one of said reactors, characterized in that it comprises, between the discharge means and the injection means, desorption means for desorbing from the sorption agent the SO2 that said sorption agent has adsorbed by being placed in contact at least once with said gas stream before said sorption agent reaches said discharge means.

The desorption means comprise, for example, at least one heating means making it possible to bring said sorption agent to a temperature close to 200° C.

The desorption means can also comprise means allowing said sorption agent to be placed in contact with a carrier gas stream.

Advantageously, the desorption means combine at least one heating means making it possible to bring said sorption agent to a temperature close to 200° C. and means allowing said sorption agent to be placed in contact with a carrier gas stream.

According to an embodiment of the invention, said at least one heating means makes it possible to heat the carrier gas to a temperature of at least 200° C., but remaining close to 200° C., before the injection of said carrier gas into a desorbing unit where the carrier gas is placed in contact with the sorption agent.

According to another embodiment, said at least one heating means is incorporated into a desorbing unit, receiving the sorption agent, and a carrier gas stream is placed in contact with said sorption agent in said desorbing unit.

The invention can preferentially be applied to reactors arranged in sequence or cascade(s), with respect to the direction of flow of the sorption agent, as described in patent document WO2007096492, the reactors being supplied at least partly in series with sorption agent. Thus, in a first embodiment, a first reactor in a sequence or cascade of reactors receives the entire quantity of fresh sorption agent required in order to adsorb all of the HF contained in the gases entering the first reactor. From the discharge means of the first reactor, the sorption agent, weakly saturated and collected by the collection means of said first reactor, is sent to the second reactor in the sequence or cascade, and so on and so forth. Thus, the sorption agent becomes saturated as it passes through the series of reactors. On leaving each reactor, on entering which the sorption agent is not saturated, said sorption agent has adsorbed HF but also SO2.

For the implementation of the method set out above, the device according to the invention is characterized in that the reactors are arranged in at least one sequence of at least two reactors supplied at least partly in series with sorption agent, and means of desorbing the SO2 from the sorption agent are placed after each reactor, optionally with the exception of the last in said sequence, or every two reactors, or after a variable number of reactors in said sequence, or starting from the reactor in said sequence in which the sorption agent has reached an overall saturation level close to 100%.

According to the invention, the passage of the sorption agent (preferably alumina) into a desorbing unit, where the sorption agent is brought to a temperature close to 200° C. and/or placed in contact with a carrier gas stream that is heated to a temperature of at least 200° C. but remaining close to 200° C., if the sorption agent is not heated, allows the SO2 contained in the sorption agent to be desorbed. Advantageously, the temperature to which the sorption agent is brought in the SO2 desorbing unit does not allow desorption of the HF. The sorption agent regenerated in this way is sent to the next reactor in the sequence or cascade and so on and so forth.

On leaving the desorbing unit, the SO2 or the SO2-laden carrier gas is, for example, sent to an upcycling system.

Let us consider 10 reactors in series, i.e. such that each of them, except the first in the series, only receives sorption agent from the discharge means of the previous reactor in the series, and requires a quantity "X" of sorption agent to adsorb all of the HF contained in the gases originating from the electrolytic cells and passing through the 10 reactors in parallel. The quantity "X" of sorption agent is injected only into the first reactor in the series. On leaving the discharge means of the first reactor, the sorption agent has captured some HF and almost all of the SO2 contained in the fraction of the gas stream having passed through the first reactor. The sorption agent is then approximately 8 to 9% saturated with HF and approximately 4 to approximately 10% saturated with SO2, corresponding to an overall saturation of approximately 12 to approximately 19%. The sorption agent is then sent to an SO2 desorbing unit in order to release almost all of the SO2 from the sorption agent, thus bringing the overall saturation rate to approximately 9%. Downstream of the desorbing unit, the sorption agent is then sent to the second reactor in the series. Thus, according to the invention, on leaving the discharge means of each reactor, the sorption agent is subjected to regeneration treatment allowing the overall saturation rate to be reduced by removal of the SO2 that has been adsorbed by the agent on contact with the gas stream fraction passing through said reactor. On arriving at the input of the last reactor in the series, as the sorption agent has an overall saturation rate of approximately 90%, it can only adsorb HF. Implementation of the invention in the manner described above allows a rate of removal of the SO2 generally comprised between approximately 60 and approximately 90%.

A desorbing unit is not necessarily placed at the output of the discharge means of each reactor in the series. The siting of the desorbing units is defined by calculation, so as to find an optimum configuration taking account of the efficiency of treatment and the cost of the installation. Depending on the circumstances, an SO2 desorbing unit is placed after each reactor, optionally with the exception of the last in a sequence or series of reactors, or every two reactors or after a certain number of reactors in a sequence or series of reactors, this number being variable from one sequence or series of reactors to another. According to a variant embodiment, an SO2 desorbing unit is only placed starting from the reactor in a sequence or series of reactors in which the sorption agent has reached an overall saturation level close to 100%. Depending on the number of reactors in the sequence or series and the SO2 and HF concentrations of the gases, it is possible to identify the exact site of the first desorbing unit as well as of the subsequent desorbing units.

BRIEF DESCRIPTION OF THE DRAWING FIGURES

Figure 2:
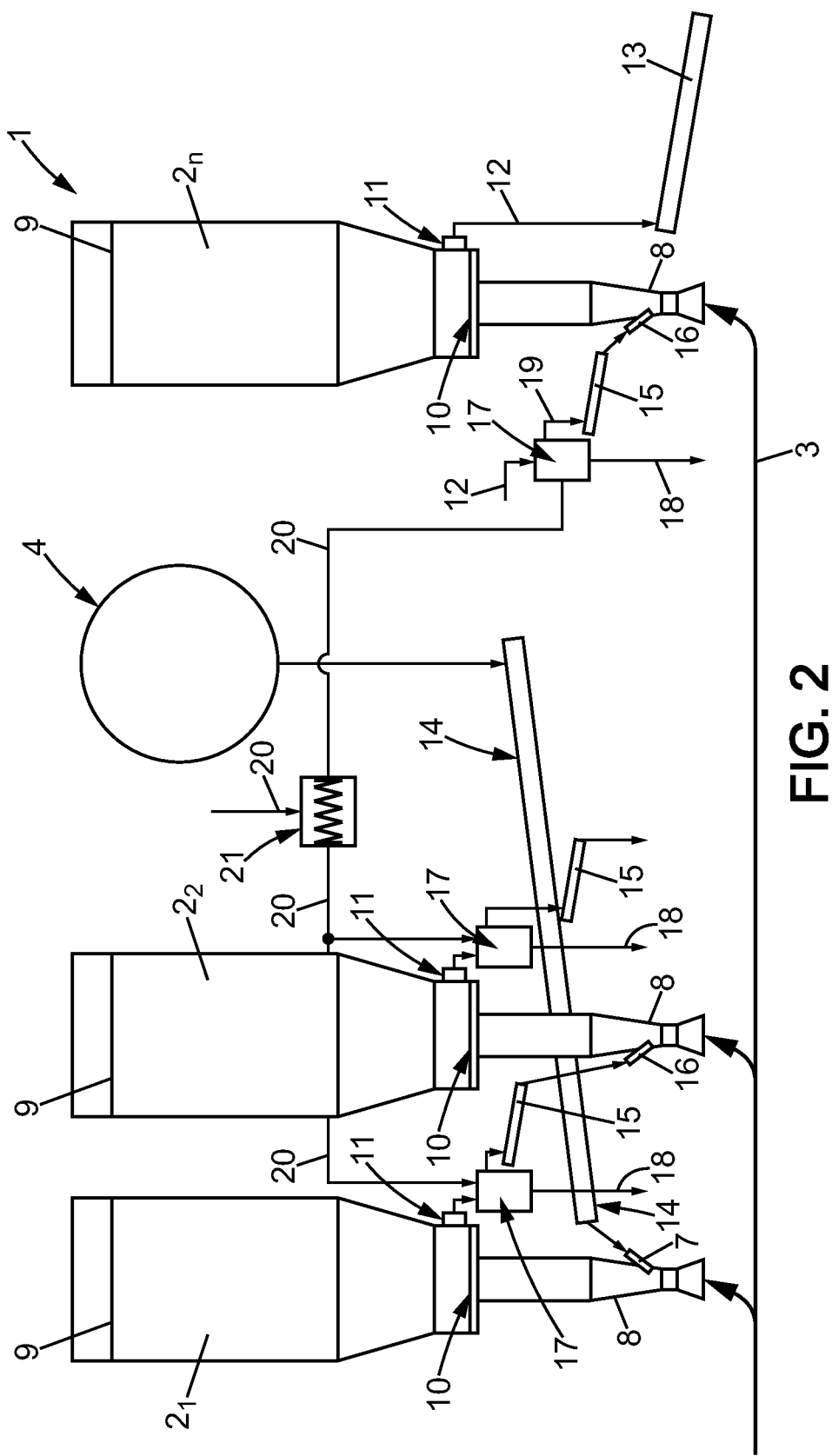
Figure 3:
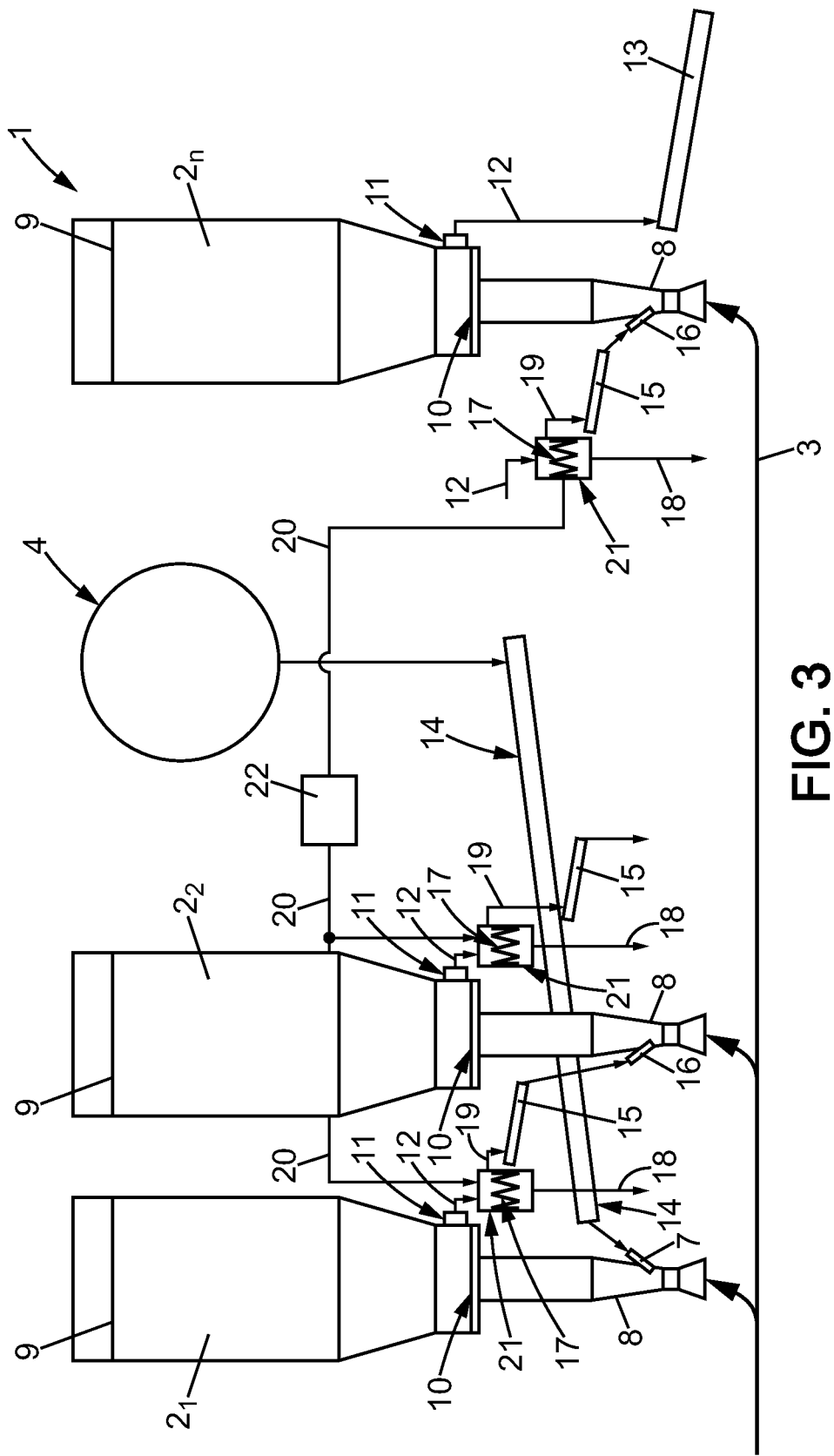

Other advantages and characteristics of the invention will become apparent from the description given below of embodiments that are illustrative only and are in no way limitative of the scope of the invention, with reference to the attached drawings, in which:

FIG. 1 is a diagrammatical view of a gas treatment centre according to an embodiment of the invention, FIG. 2 is a representation similar to that in FIG. 1 of an embodiment of the invention in which a carrier gas is heated before being distributed and introduced into the desorbing units of the treatment centre and being placed in contact with the sorption agent contained in the desorbing units, and FIG. 3 is a representation similar to those in FIGS. 1 and 2 of a variant embodiment in which the sorption agent is heated in the desorbing units, into which is introduced a carrier gas thus placed in contact with the heated sorption agent in order to desorb the SO2.

As shown in FIGS. 1 to 3, the present invention relates to a gas treatment centre 1 made up of a plurality of reactors $2_1, 2_2, \ldots, 2_n$ in which a preferably ascending gas stream 3 that must be scrubbed of effluents flows in parallel. The first reactor $2_1$ is supplied with a fresh sorption agent of the powder material type, of a type known per se, for example alumina (Al2O3) originating from fresh powder material storage means 4 of the silo type, and distributed to the first reactor $2_1$ using distribution means 14, provided between the storage means 4 and the reactor $2_1$.

DETAILED DESCRIPTION OF THE INVENTION

More precisely, the distribution means 14 connects the storage means 4 to injection means 7, of a type known per se, of the powder material in the reactor $2_1$. The distribution means 14 is for example an airslide, it being understood that the transport of the sorption agent of the powder material type is carried out according to any means known in the prior art, for example according to a method for conveying powder materials in a hyperdense bed.

The storage means 4, such as a hopper, dumps the sorption agent into a single distribution means 14 dumping its entire contents into the first reactor $2_1$ using the injection means 7. In this embodiment of the invention, the n-1 other reactors $2_2, \ldots, 2_n$ do not receive fresh sorption agent originating from the storage means 4.

For the sake of clarity, FIG. 1 shows only three reactors $2_1, 2_2, \ldots, 2_n$, it being understood that the invention can be applied to any gas treatment centre comprising at least two reactors. The reactors $2_1, 2_2, \ldots, 2_n$ are particularly intended to allow the powder material to be placed in contact, according to any means known in the prior art, with a gas stream that must be scrubbed of effluents.

The principle of the invention applies more particularly to gas streams 3 originating from aluminium electrolytic cells, and containing pollutant effluents of the fluorinated agents type, for example hydrofluoric acid (HF) and sulphur dioxide (SO2), which are neutralized by the powder material, in this example alumina $Al_2O_3$, by adsorption.

Preferentially, the reactors $2_1, 2_2, \ldots, 2_n$ are all identical, i.e. they have the same gas stream treatment capacity. In this manner, the reactors $2_1, 2_2, \ldots, 2_n$ each receive the same quantity of powder material, it being understood that each reactor $2_1, 2_2, \ldots, 2_n$ receives an equal fraction of a single gas stream 3. However, a person skilled in the art can adapt the principle according to the invention to any type of reactor group, whether the reactors are all identical or not.

Each of the reactors $2_2, \ldots, 2_n$ other than the first $2_1$ is equipped with injection means 16 substantially identical to the injection means 7 of the first reactor $2_1$. Advantageously, the injection means 7 or 16 is placed substantially at the input of a nozzle 8 of the corresponding reactor $2_1$, or $2_2, \ldots, 2_n$, into which the corresponding fraction of the gas stream 3 enters.

Once the powder material has been injected into the reactor $2_1$, or $2_2, \ldots$, or $2_n$, the material is placed in contact with the corresponding fraction of the gas stream 3 by any means known per se, allowing optimal placing in contact of the gas stream 3 with the powder material, resulting in optimum scrubbing of the pollutant effluents present in the gas stream. When the powder material is placed in contact with the preferably ascending fractions of the gas stream 3, the powder material is entrained in the gas stream 3 in a movement that is advantageously ascending.

Downstream of each reactor $2_1, 2_2, \ldots, 2_n$, i.e. on their upper part, filter means 9, for example of the cloth filter or bag filter type, prevent the emission of particle grains of powder material and dusts from the reactor $2_1, 2_2, \ldots, 2_n$ and into the atmosphere.

After the sorption agent (the powder material) has been placed in contact with the gas stream 3 and the gas stream 3 has been filtered by the filter means 9, collection means 10, of any type known per se, are provided in hoppers at the base of the reactors $2_1, 2_2, \ldots, 2_n$. for the particles of powder material, and the collection means 10 are connected, by means known per se, to discharge means 11 of the sorption agent laden with effluents adsorbed in the reactor $2_1, 2_2, \ldots, 2_n$.

The discharge means 11 are of a type known per se and are presented, for example, in the form of one or more orifice(s) connected to a discharge pipe 12, for example, of the airslide type, at least one discharge pipe but possibly each of them discharging into an SO2 desorbing unit 17, except for the last reactor $2_n$, for which the pipe 12 discharges into a main pipe 13 for sorption agent laden with effluents, in particular fluorinated effluents.

Thus, as fresh sorption agent, such as fresh alumina, is supplied to the first reactor $2_1$ in which a gas stream 3 that must be defluorinated and desulphurized flows, fluorinated and sulphur-laden alumina is obtained from the corresponding discharge pipe.

The SO2 desorption units 17 are designed so as to allow the powder material originating from the discharge pipes 12 to be placed in contact, according to any means known in the prior art, with a carrier gas stream. Advantageously, the powder material in the desorbing units 17 is kept in a fluidized condition.

In the embodiment in FIG. 2, the carrier gas, conveyed from a source (not shown) to each of the desorbing units 17 via pipelines 20, is nitrogen. According to FIG. 2, the carrier gas is preheated to a temperature above 200° C. but remaining close to 200° C. in a centralized heating device 21, before being injected into each of the desorbing units 17 at the downstream end of a corresponding pipeline 20, this temperature preferably being in the range extending from 200° C. to 250° C.

According to another embodiment, shown in FIG. 3, the carrier gas, supplied by a source 22 connected to each desorbing unit 17 by a pipeline 20, is not preheated before being injected into the desorbing units 17. The latter are each equipped with dedicated heating means 21, incorporated into the corresponding desorbing unit 17, making it possible to bring the powder material to be desorbed to a temperature of approximately 200° C. or close to 200° C. For example, the temperature is within the range extending from 180° C. to 250° C.

The heating means 21 in FIG. 3 and the heating means 21 in FIG. 2 can be of any type known per se, for example electric (with heating resistor).

On leaving each desorbing unit 17, the SO2-laden carrier gas is, for example, channelled by a pipe 18 to a treatment device, not shown in FIGS. 1 to 3, allowing the SO2 to be separated from the carrier gas 20.

On leaving the desorbing unit 17 of the first reactor $2_1$, all of the HF-laden sorption agent from which the SO2 has been desorbed is transferred to the injection means 16 of the second reactor $2_2$ via a discharge pipe 19 connected to an airslide 15 for recycling the sorption agent, also advantageously of the fluidized bed type, or of any type known per se allowing powder materials or sorption agents to be transported. The same applies between the second $2_2$ and third reactors, and so on until the last reactor $2_n$, the injection means 16 of which receive, via a corresponding discharge pipe 19 and recycling airslide 15, all of the HF-laden sorption agent from which SO2 has been desorbed in the desorbing unit 17 on leaving the penultimate reactor $2_{n-1}$, which has been filtered and collected in the penultimate reactor $2_{n-1}$ (not shown in FIGS. 1 to 3) such that the n reactors of the sequence are arranged in series with respect to the flow of the sorption agent between the distribution means 14 supplying the first reactor $2_1$ and the main pipe 13, leaving the last reactor $2_n$.

In this way, in the case of the scrubbing of the HF and the SO2 contained in waste gases originating from aluminium electrolytic cells, the quantity of fresh alumina (sorption agent) remains for some time in the first reactor $2_1$ where it becomes enriched in HF and SO2. It is then treated in order to desorb the SO2 before being totally discharged into a second reactor $2_2$. It remains there for the same time as in the first reactor $2_1$ and continues to be enriched in fluorides and again captures SO2. The process continues in this way until the $n^{th}$ reactor $2_n$, where it is discharged into a main pipe 13 for fluorinated alumina for its recycling into electrolytic cells, for example, or into any other type of storage or recycling means. Thus, only the $n^{th}$ reactor $2_n$ is connected to a main pipe 13 through which the sorption agent, laden with effluents after its passage through the n reactors, but from which the SO2 has been desorbed, is discharged.

The invention is not limited to the installations according to the above-described FIGS. 1 to 3, but also extends to installations in which all of the reactors in at least one sequence of reactors except the first in the sequence, of the reactor group in the installation, each have their injection means 16 supplied not only with recycled sorption agent from the discharge means 11 of the immediately preceding reactor in the sequence, but also with fresh sorption agent originating from the storage means 4, in a smaller quantity than that received by the injection means 7 of the first reactor in the sequence, which remains the only reactor supplied only with fresh sorption agent, as shown in FIG. 3 and the right-hand half view in FIG. 5 of WO 2007/096492 and as described with reference to the Figures in said patent document, to which reference may be made for further details in this regard. As in FIG. 4 of WO 2007/096492, one of the reactors in the reactor group of an installation according to the invention can be the first reactor supplied only with fresh sorption agent and common to two sequences of reactors each supplied in series with recycled sorption agent from the immediately preceding reactor in the sequence, or in series-parallel, each receiving not only the recycled sorption agent from the preceding reactor, but also fresh sorption agent. Moreover, and as known in the state of the art, at least one reactor in the installation group, and optionally, all the reactors in at least a single sequence or series of the group, including the first and last reactors in the sequence or series, each have injection means 7 or 16 also supplied with recycled sorption agent from the discharge means 11 of the very reactor in question.

For all of the above reasons, according to the installations according to the invention, it is not essential for each reactor but at least for one of said reactors to be equipped with a desorbing unit 17, and it can be appropriate to provide only one desorbing unit 17 every two, three, four or even more consecutive reactors in a sequence or series, the number of reactors being variable from one installation to another. As an alternative, an SO2 desorbing unit 17 can be installed after each of the reactors or only some of them, in a sequence, starting from the reactor in the sequence in which the sorption agent has reached an overall level of saturation close to 100%, and preferably its maximum saturation level, but which can be within the range extending from about 85% to 100%.

The invention claimed is:

1. A method of capturing SO2 present in gases originating from cells for the industrial production of aluminium by igneous electrolysis, comprising the steps of:
    injecting a sorption agent into a gas stream of gases originating from cells for the industrial production of aluminium by igneous electrolysis, the gas stream with the sorption agent passing into and then through a group of at least two reactors, the gas stream passing being passed through the group of at least two reactors in a parallel manner with a first part of the gas stream containing the sorption agent passing through a first reactor of the group of at least two reactors at a same time as a second part of the gas stream containing the sorption agent is passed through a second reactor of the group of at least two reactors,
    wherein the sorption agent is a powder material,
    wherein in passing the gas stream through the first and second reactors, the sorption agent in the first and second parts of the gas stream adsorb effluents present in said gas stream;
    after the sorption agent has adsorbed the effluents, using a collecting means, collecting said sorption agent in the first and second parts of the gas stream and, using a discharge means, discharging the collected sorption agent to a SO2 desorption unit;
    using the SO2 desorbing unit, desorbing SO2 in collected sorption agent to form fresh sorption agent;
    via an injecting means, injecting the fresh sorption agent into a third part of part of the gas stream passing into and through at least a third one of said reactors.

2. The method according to claim 1, wherein said sorption agent is alumina $Al_2O_3$.

3. The method according to claim 1, wherein SO2 is desorbed from said collected sorption agent by said collected sorption agent being brought to a temperature in a range extending from 180° C. to 250° C.

4. The method according to claim 1, wherein, in the desorbing SO2 step, the SO2 is desorbed from said collected sorption agent by placing said collected sorption agent in contact with a carrier gas.

5. The method according to claim 4, wherein said carrier gas is nitrogen.

6. The method according to claim 4, wherein said carrier gas is heated to a temperature of at least 200° C., but remaining in a range extending to 250° C. before being placed in contact with said collected sorption agent.

7. The method according to claim 1, wherein said desorbing SO2 step includes heating by said collected sorption agent to a temperature in a range extending from 180° C. to 250° C., and
    wherein at least one of said reactors is free of any said SO2 desorption unit.

8. The method according to claim 1, wherein,
    said sorption agent is alumina $Al_2O_3$,
    in the desorbing SO2 step, the collected sorption agent is brought to a temperature in a range extending from 180° C. to 250° C. to form heated sorption agent, and
    in the desorbing SO2 step, the heated sorption agent is brought into contact with nitrogen having been heated to a temperature of at least 200° C., but remaining in a range extending to 250° C., the nitrogen having been heated before being placed into the contact with said heated sorption agent.

9. A system for capturing SO2 present in gases originating from cells for the industrial production of aluminium by igneous electrolysis, said system comprising:

a gas line providing a gas stream of gases originating from cells for the industrial production of aluminium by igneous electrolysis;

at least first, second, and third reactors connected to the gas line, a first part of the gas stream being provided to the first reactor, a second part of the gas stream being provided to the second reactor, and a third part of the gas stream being provided to the third reactor;

an injector means that injects a sorption agent into the first and second parts of the gas stream so that the system is operative for injecting the sorption agent into the gas stream passing into and through the first and second reactors, the gas stream being passed through the first and second reactors with the first part of the gas stream containing the sorption agent passing through the first reactor and the second part of the gas stream containing the sorption agent being passed through the second reactor, wherein the sorption agent is a powder material, wherein in passing the gas stream through the first and second reactors, the sorption agent in the first and second parts of the gas stream adsorb effluents present in said gas stream;

first, second, and third collecting and discharging means located respectively in each of the first second and third reactors down, each collecting and discharging means collecting said sorption agent in the first and second parts of the gas stream after the sorption agent has adsorbed the effluents, and then discharging the collected sorption agent;

first and second SO2 desorption units operatively connected to accept the collected sorption agent discharged respectively from the first and second discharge means, the SO2 desorbing unit operative to desorb SO2 in collected sorption agent to form fresh sorption agent; and an injecting means operatively connected to accept the fresh sorption from at least one of the first and second SO2 desorption units and inject the fresh sorption agent into the third part of part of the gas stream passing into the third reactor.

10. The system according to claim 9, wherein each said SO2 desorption means comprises at least one heating means configured to bring said collected sorption agent to a temperature in a range extending from 180° C. to 250° C.

11. The system according to claim 10, wherein each said SO2 desorption means comprises means to place said collected sorption agent in contact with a carrier gas stream.

12. The system according to claim 11, wherein said at least one heating means is configured to heat said carrier gas to a temperature of at least 200° C., but remaining in a range extending to 250° C., before said carrier gas is placed in contact with said collected sorption agent.

13. The system according to claim 10, wherein said at least one said heating means is incorporated into each SO2 desorbing unit, and each SO2 desorbing unit further comprises means to place a carrier gas stream in contact with said collected sorption agent within said SO2 desorbing unit.

14. The system according to claim 9, wherein at least one of said reactors is free of any said SO2 desorption unit.

\* \* \* \* \*